United States Patent [19]

Bradley et al.

[11] 4,447,072
[45] May 8, 1984

[54] SUSPENSION FOR PIVOTALLY MOUNTING A RIGID AXLE ASSEMBLY

[75] Inventors: Kirk D. Bradley, Gladstone; Robert R. Koski, Rock; James W. Clark, Gladstone, all of Mich.

[73] Assignee: Envirotech Corporation, Salt Lake City, Utah

[21] Appl. No.: 330,545

[22] Filed: Dec. 14, 1981

[51] Int. Cl.³ ............................................. B60D 7/00
[52] U.S. Cl. ................................ 280/492; 267/21 R; 267/63 R; 280/111; 280/688
[58] Field of Search .................... 280/111, 112 R, 492, 280/688, 716; 267/21 R, 21 A, 63 R

[56] References Cited

U.S. PATENT DOCUMENTS

| 2,491,283 | 12/1949 | Schoenrock | 280/112 R |
| 3,756,095 | 9/1973 | McCay, Jr. et al. | 180/70.1 |
| 3,865,443 | 2/1975 | James | 267/63 R |

Primary Examiner—David M. Mitchell
Assistant Examiner—Kenneth R. Rice

Attorney, Agent, or Firm—Robert E. Krebs

[57] ABSTRACT

A suspension for a rigid front axle assembly (28) of an articulated mining truck (10) includes a bolster plate (30) upon which the axle assembly is fixedly cradled, a spherical or swivel bearing assembly (36) connecting the front end of the bolster plate to the chassis of the vehicle, and a hollow unitary elastomeric block (70) that is mounted to resiliently couple the rear end of the bolster plate to the chassis. The elastomeric block is preferably elongate and longitudinally oriented, and the block has a cavity that extends longitudinally through its center that is aligned with a longitudinal axis (A-A) through the spherical bearing. The elongate walls thus provided at the sides of the elastomeric block are sufficiently flexible to bulge outwardly when the axle assembly oscillates about the longitudinal axis A-A. The elastomeric block further permits the axle assembly to swing a limited amount about an axis (D-D) extending transversely of the bearing to thereby act as a spring for cushioning shock loading on the front axle.

3 Claims, 6 Drawing Figures

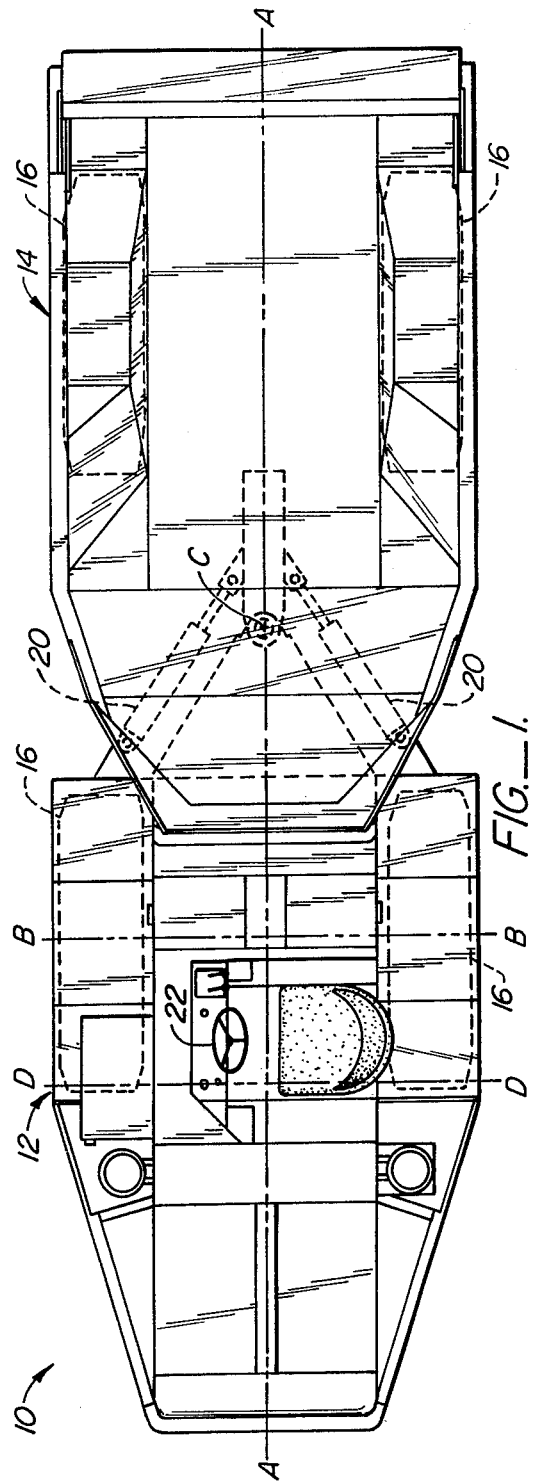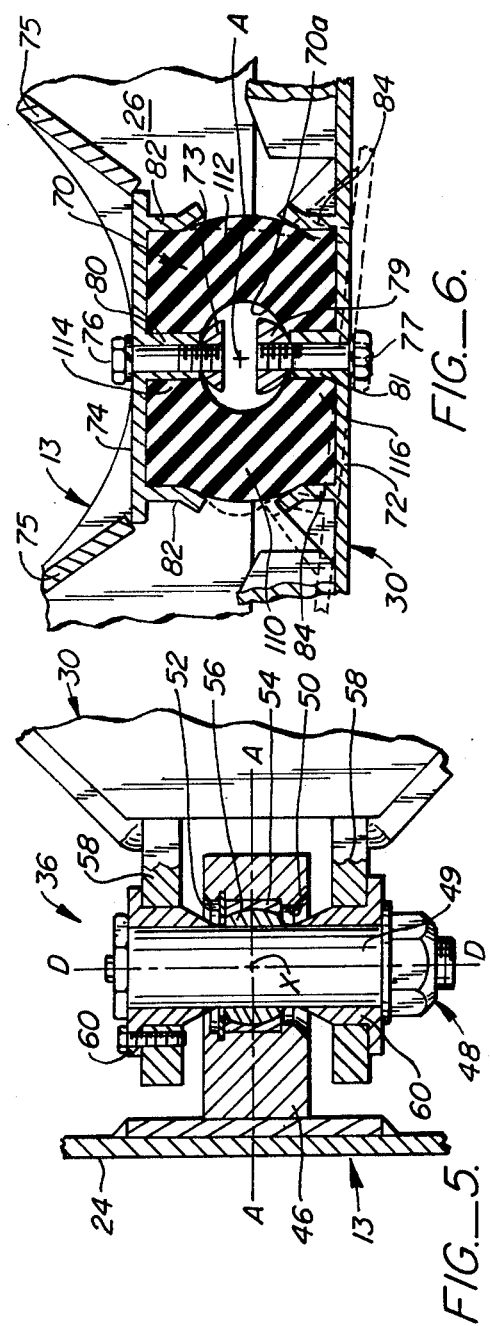

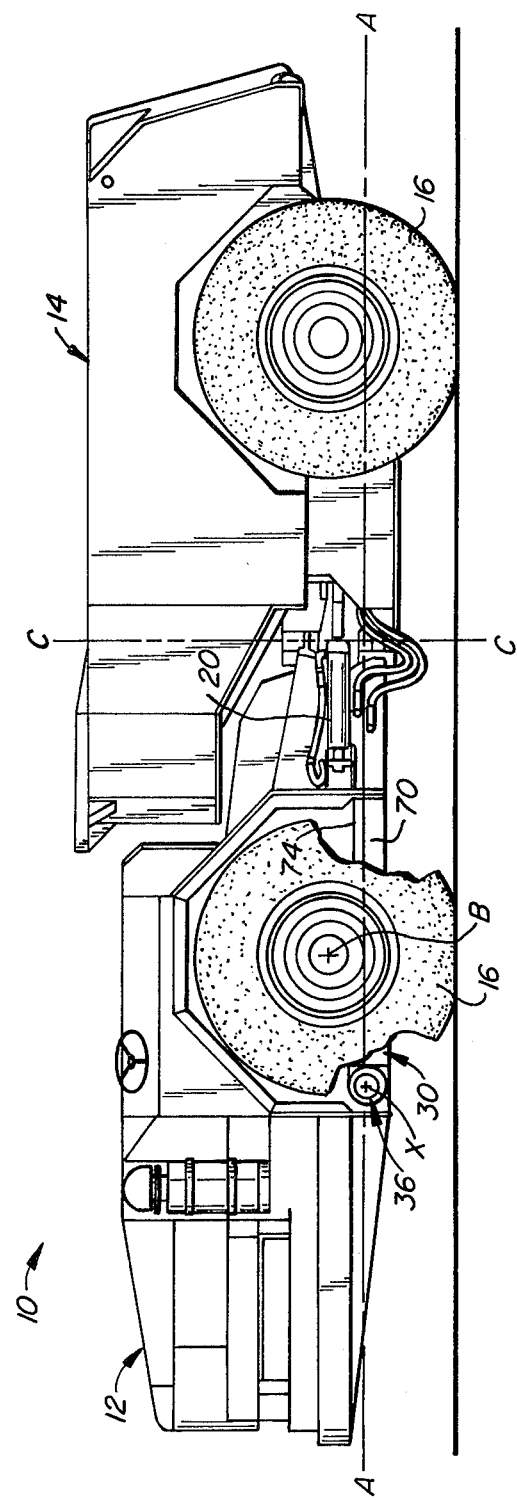
FIG._2.

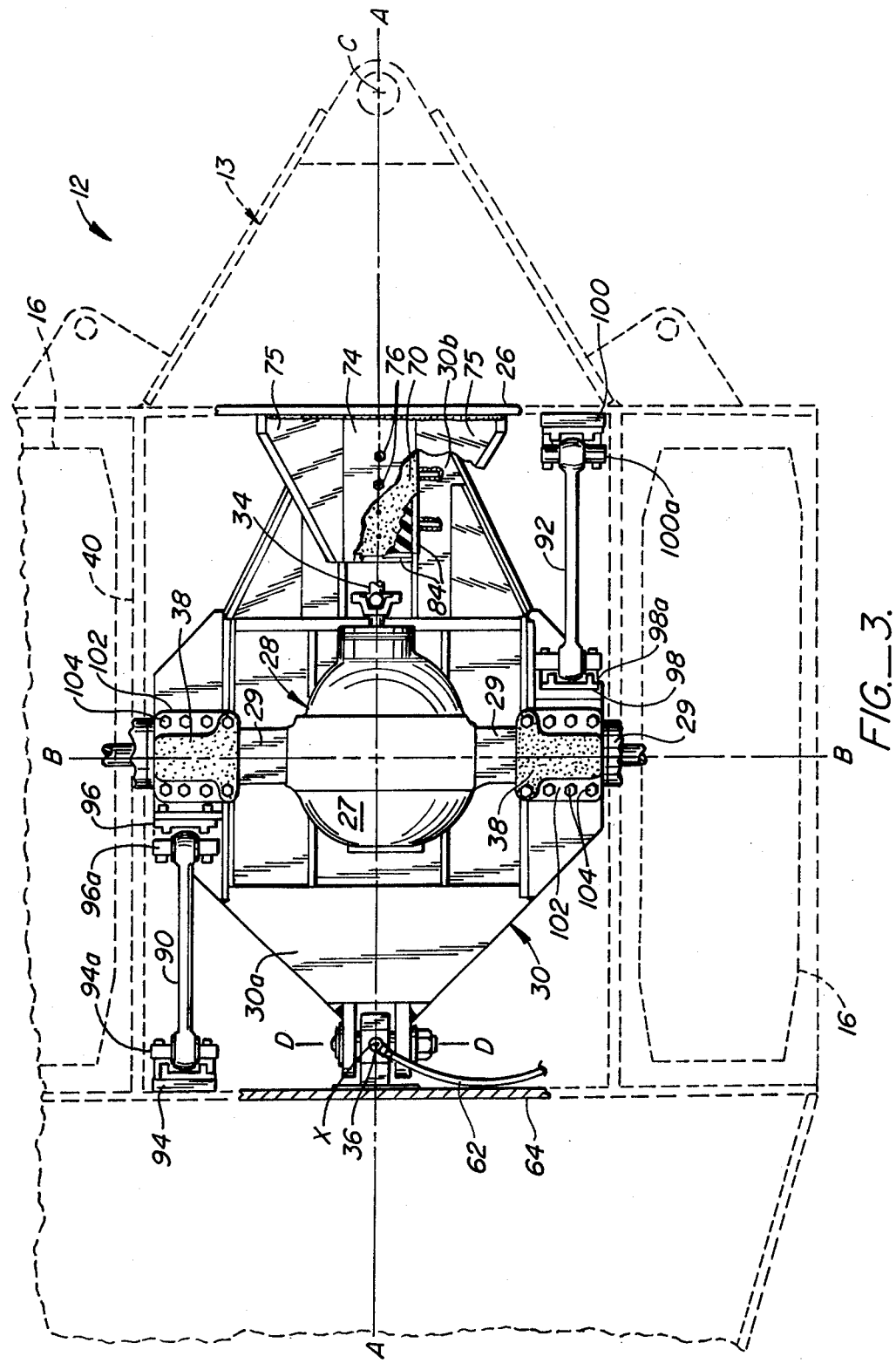
FIG._3.

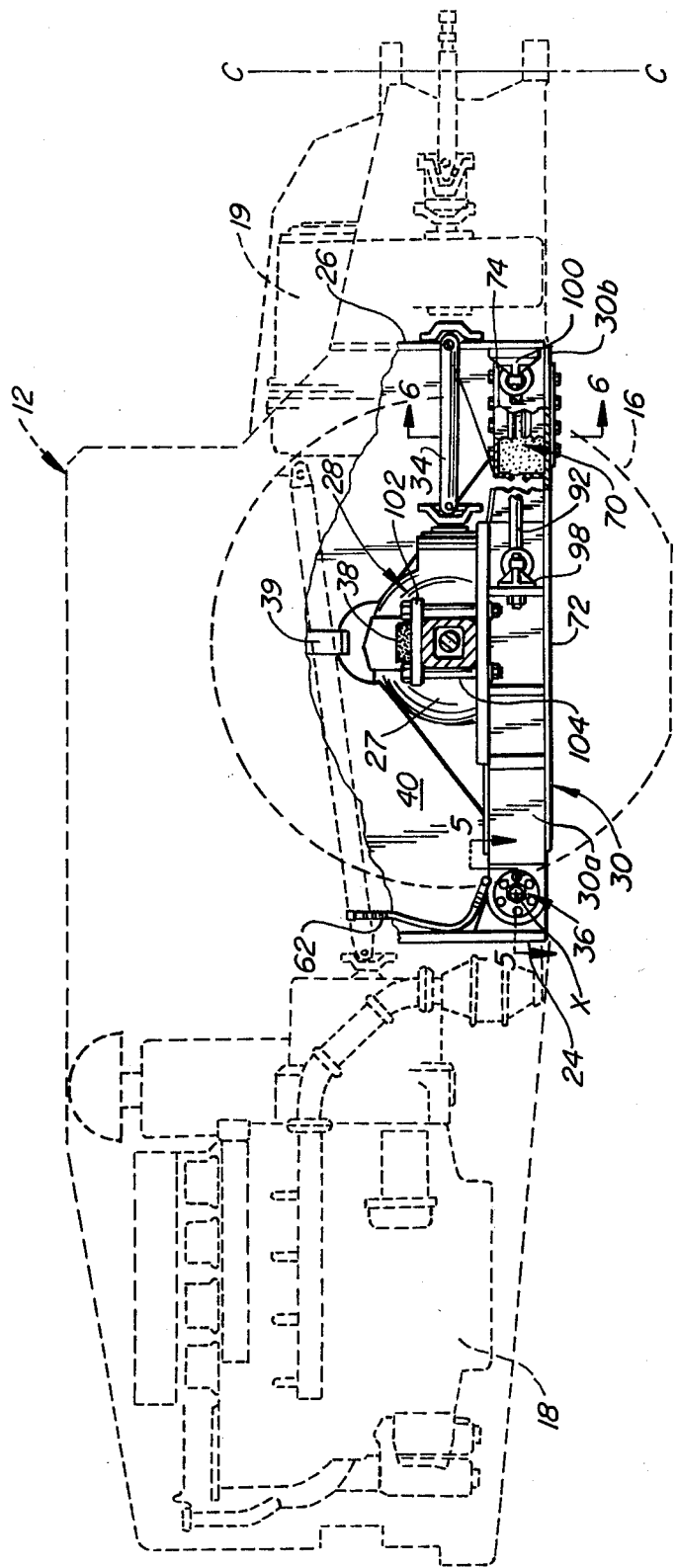
FIG._4.

SUSPENSION FOR PIVOTALLY MOUNTING A RIGID AXLE ASSEMBLY

BACKGROUND OF THE INVENTION

The present invention relates to suspensions for relatively heavy vehicles such as mining trucks, and more particularly the present invention relates to a suspension for a rigid axle assembly that permits the axle assembly to pivot or oscillate about an axis that projects longitudinally of the vehicle.

Typically, an articulated mining truck has four wheels that are provided with four wheel drive, and its front axle is suspended so that it can oscillate through plus or minus 6° about the longitudinal axis of the vehicle. Such pivoting capability is desireable because otherwise traction may be lost in the event one of the driven front wheels leaves contact with the ground. Loss of traction must be avoided because the steering of the truck, of course, depends upon good traction of both front wheels.

In one prior art example of a pivotal suspension for the front axle of an articulated mining truck, the front wheels are mounted to a rigid axle assembly that is, in turn, mounted upon a bolster plate structure. The bolster plate is pivotally mounted to the chassis of the front section of the truck by a pair of journal bearings that permit the bolster plate to pivot about a longitudinal axis through the bearings, thereby permitting the front axle assembly to oscillate sideways relative to the chassis. This bolster plate type of suspension requires accurate alignment of the bearings with respect to each other and the longitudinal axis of the vehicle.

In some other prior art mining trucks, the rigid front axle assembly is directly supported upon a pair of leaf springs located near the wheels. This type of suspension permits the axle assembly to oscillate sideways and also to move vertically under shock loading. That is, the leaf springs not only permit the axle assembly to tilt, but they also absorb shocks, thus smoothening the ride and reducing driver fatigue.

SUMMARY OF THE INVENTION

The present invention provides a bolster plate type of suspension for a rigid axle assembly for a vehicle, such as an articulated mining truck, that not only permits the axle to pivot or oscillate about the vehicle's longitudinal axis, but also which permits the axle to swing a limited amount about a transverse axis located forward of the axle assembly. The suspension includes a unitary elastomeric member that connected between the chassis and the bolster plate at the rear end of the bolster plate which is adapted to dampen shocks and vibrations.

In accordance with the preferred embodiment of the present invention, the front end of the bolster plate for supporting the axle assembly is connected by a spherical bearing to the chassis of the vehicle so that the bolster plate can pivot both about an axis extending longitudinally of the vehicle and about a transverse axis so that the axle may swing vertically about such transverse axis. The rear end of the bolster plate is resiliently supported by the unitary elastomeric member which is mounted to the vehicle frame in longitudinal alignment with the spherical bearing. Preferably, the elastomeric member is elongated and has a air cavity formed therein that is longitudinally and vertically aligned with the bearing. The elastomeric member is sufficiently resilient to permit the axle to pivot about the longitudinal axis through the selected angle and also to collapse or compress to cushion pivoting about the transverse axis. The resilient attachment of the rear end of the bolster plate structure to the frame with the use of such a unitary elastomeric member will be appreciated to provide a simple sturdy means for permitting oscillation of the axle assembly to assure proper traction and acts as a spring to also cushion the chassis from shocks or vibrations that occur when the vehicle is driven in rugged terrain. Thus, the suspension assures high maneuverability on rough terrain, while also minimizing driver fatigue.

BRIEF DESCRIPTION OF THE DRAWINGS

FIG. 1 is a top plan of an articulated mining truck including the pivotal suspension of the present invention.

FIG. 2 is a side elevation of the truck with parts of a front wheel thereof being broken away to illustrate the suspension.

FIG. 3 is a fragmentary view illustrating the suspension in top plan, with various parts of the chassis being shown in dashed outline.

FIG. 4 is a view which illustrates the suspension in side elevation, with parts being broken away to illustrate the unitary elastomeric member at the rear end of the suspension, and with also the outline of the drive unit of the truck and the engine and transmission therein illustrated in dashed outline.

FIG. 5 is a section taken as indicated by line 5—5 in FIG. 4.

FIG. 6 is a section taken as indicated by line 6—6 in FIG. 4.

DESCRIPTION OF THE PREFERRED EMBODIMENT

Referring now to FIGS. 1 and 2, the preferred embodiment of an articulated mining truck 10 includes a front portion or drive unit 12 and a rear portion or trailer 14. The truck has four wheels 16 that are each driven, and the engine 18 and transmission 19 are (FIG. 4) located in the drive unit. The drive unit and trailer are pivotably connected for articulation about a vertical axis C-C (FIG. 2), and a pair of double-acting cylinders 20 are coupled between the drive unit and trailer at opposite sides of the articulation point. A conventional hydraulic control circuit activated by a steering wheel 22 in the driver compartment is provided for controlling the cylinders 20. That is to say, the front and rear wheels are not individually steerable. Rather the front wheels are non-steerably mounted, using planetary gear reduction drives at each wheel. An example of a suitable planetary drive is disclosed in U.S. Pat. No. 3,756,095, the disclosure of which is incorporated herein by reference.

The drive unit 12 of the articulated vehicle 10 includes a main frame or chassis 13 that has vertical transverse walls 24 and 26 that are respectively located in front of and to the rear of the front wheels 16. The front wheels are mounted to a rigid axle assembly 28 that, in turn, is fixedly cradled upon a bolster plate or support structure 30. The bolster plate is pivotally mounted between chassis walls 24 and 26 to, of course, assure that the common axis B-B of the axle housings 29 of the axle assembly extends transversely with respect to a centerline axis A-A of the drive portion of the vehicle. Power for driving the front wheels is transmitted to the input shaft of a differential gear located within the central differential housing portion 27 by flexibly-connected propeller shaft 34 that extends forwardly from the transmission.

The rigid front axle assembly 28 ("rigid" meaning that the axle housings 29 do not move independently of each other) is mounted to the chassis 13 of the drive unit 12 so that the axle assembly may pivot about the longitudinal axis A-A of the drive unit and also swing about a transverse axis D-D located ahead of the axle assembly. Toward this end, the front end 30a of the bolster plate 30 is coupled by a spherical bearing 36 to the chassis to permit the bolster plate to swivel about a point of revolution X lying in a plane through the centerline A-A, whereby it may pivot longitudinally about the transverse axis D-D (FIG. 3) and oscillate sideways about the longitudinal axis A-A. The rear end 30b of the bolster plate is resiliently connected to the chassis by a unitary elastomeric or resilient member 70. The resilient mounting of the rear end of the bolster plate to the chassis is such that the bolster plate, and thus the rigidly mounted axle assembly 28, may oscillate approximately 6° in either direction, i.e., above or below a plane that is normal to the articulation axis C-C. Such angle is set by a stop arrangement including rubber stop pads 38 that are mounted to the bolster plate above the ends of the axle housings and at the sides of the bolster plate. The rubber stop pads are adapted to bear against brackets 39 (FIG. 4) connected to the sidewalls 40 of the chassis (FIGS. 3 and 4) that define the interior walls of the front wheel wells.

Referring to FIGS. 1, and 3-5, it will be seen that the spherical bearing 36 for pivotally mounting the front end of the bolster plate 30 to the chassis wall 24 includes a post 46 extending perpendicularly from the transverse chassis wall 24 at the centerline A-A of the front portion of the drive unit 12. Bearing post 46 has a bore formed transversely therethrough for receiving a bearing pin assembly 48. The bore in the post has a shoulder 50 formed adjacent near one end thereof and a groove near its opposite end for receiving a snap ring 52, and a bearing sleeve 54 is engaged in the bore between the ring and the shoulder. The bearing sleeve 54 has a truncated, concave, spherical bearing surface formed in the bore thereof, the center of revolution X of which is located along the center line A-A of the front portion. The bearing pin 48 assembly includes a pin 49 and a truncated, convex, spherical bearing collar 56 engaged upon the pin at its center, such bearing 56 is complementally shaped to revolve within the outer bearing sleeve 54. The bolster plate structure 30 includes a pair of parallel bracket arms 58 extending forwardly from its front end 30a. The bracket arms 58 have aligned bores formed transversely therein for receiving sleeves 60. The sleeves 60 are affixed to the bracket arms by bolts and have tapered inner ends that are substantially spaced from tapered or beveled end portions of the bore formed in the post 46; the sleeves abut against the ends of bearing 56 to hold the bearing in place. Lubrication, such as grease, is fed through a tube 62 to lubricate the bearing surfaces between the bearing collars 54 and 56. It will thus be seen that the bolster plate may swivel about the center X of the truncated spherical surfaces of the bearing elements 54 and 56.

As previously indicated, the means for resiliently connecting the rear end 30b of the bolster plate 30 to the chassis 13 includes a unitary resilient member 70 made of an elastomeric material, such as rubber. The lower end of the resilient member is bolted to the floor 72 of the bolster plte, and its upper end is bolted to a rectangular support plate 74 (FIGS. 3, 4 and 6) that extends perpendicularly and forewardly from the transverse wall 26 at the rear end of the axle housing. The plate 74 is bolstered by triangular gussets 75. The rubber member 70 is elongate and has a rectangular outline in cross-section when unstressed (FIG. 6 shows the outline in its stressed condition). That is, it is in the shape of an elongate block. It has a cylindrical cavity or bore 70a extending longitudinally from its front to its rear end, as mounted. This rubber block is commercially available, having been heretofore used to form rubber fender on a shipyard dock. As may be seen in FIG. 6, member 70 is captured between the bolster plate 30 and the support wall 74 so that the axis A-A, which extends through the center of revolution X of the bearing collars 54 and 56, extends in approximate coaxial relation with the cylindrical bore or cavity formed in the rubber block. That is, the cavity is generally longitudinally and vertically aligned with the desired longitudinal pivot axis A-A of the bolster plate.

Referring to the enlarged fragmentary sectional view in FIG. 6, it will be seen that the upper end of the rubber block 70 is suspended from the bracket plate 74 by a series of bolts 76 extending vertically downwardly in the center plane of the drive unit 12. The bolts extend through bores that are formed through the upper wall 114 of the block in a straight line (FIG. 3), and the bolts are threaded into bores formed in an elongate metal support rod 73. The support rod 76 has a hemi-cylindrical configuration and is attached so its curved surface faces upwardly against the curved inner surface of the cylindrical hollow formed in the rubber block. Spacer tubes 80 for receiving the bolts are interposed between the rod 78 and the bracket wall 74 so that when the bolts are tightened to the strip, the rubber block is not substantially compressed between the strip and the bracket wall. Thus, the rubber block is simply suspended upon the strip 78. A symmetrical arrangement of similar series bolts 77, a hemi-cylindrical support rod 79 and spacer tubes 81 are utilized to attach the trailing end of the bolster plate from the lower wall 116 of the rubber block. It will be seen that this mounting arrangement is such that the upper wall 114 and the lower wall 116 of the resilient member 70 are respectively mounted to the chassis and bolster plate by means which are vertically spaced from each other and by means that extend vertically through the center of mass; that is, as mounted, the side walls 110 and 114 of the member 70 are symmetrically disposed with respect to a plane through the centerline A-A.

The upper end of the rectangular elastomeric member 70 is confined by a rectangular arrangement (in plan) of flanges 82 projecting downwardly from the support plate 74 thereby constraining movement of the upper end of the rubber block. Similarly, a rectangular arrangement of flanges 84 (FIG. 3) extend upwardly from the floor 72 of the bolster plate structure 30 for capturing the lower end of the block. It will be best seen in FIG. 6 that the outer edges of the flanges are bowed outwardly away from the block 70 to permit the side walls to bulge outwardly without undue shear stresses being induced at the edges of the flanges. It will also be seen in FIG. 6 that flanges 82 and 84 are sized so they are vertically spaced, apart from each other by a substantial distance, whereby when the bolster plate pivots about the axis A-A (indicated by point A in FIG. 6), the side walls 110 and 112 of the block between the hollow and the flanges will be able to flex or bulge outwardly by a sufficient amount to permit the aforementioned 6° of oscillation.

The phantom outlining in FIG. 6, roughly indicates the suspected bulging of the right side of the rubber block 70 when the right axle housing oscillates upwardly. It will be seen that the sidewall 110 of the rubber block formed to the right of the cylindrical hollow 70a bulges outwardly, while the other sidewall 112 at the left of the cavity relatively straightens or unflexes. It will be appreciated that the rubber block will also be compressed in addition to the illustrated bulging or outward flexing and also that some torsion may be induced in the sidewalls 110, 112 and to a greater extent in the top and bottom walls 114 and 116. However, the illustrated straightening and bulging action is believed to represent the predominant stress-inducing action induced on the elastomeric member by oscillation of the bolster plate about axis A-A. This is significant because the unitary elastomeric member 70 is believed to be capable of withstanding the illustrated bulging over a long prolonged period, thus providing a resilient mounting means that is reliable and maintenance-free.

The bolster plate suspension of the present invention not only permits oscillation of the axle assembly 28 about the longitudinal axis A-A, but further permits the axle assembly to swing about the transverse axis D-D through the spherical bearing assembly 36. The hollow rubber block 70 is sufficiently resilient to flex under loading to absorb shock transmitted to the bolster plate by the front wheels. The rubber block will flex or bulge at both sidewalls 110 and 112 when shocks are transmitted through the front wheels to cause the front axle to pivot upwardly against the rubber block. It will be appreciated that the rubber block will absorb shock impulses not only when it is in the horizontal position shown in FIG. 6; the block will also deform to absorb shocks when the axle is already oscillated, for example, when it is in the oscillated position shown in phantom outline FIG. 6.

In a preferred embodiment, the resilient member 70 has a rectangular outline in its transverse cross-section; specifically, it may be 5 in. high and 6.5 in. wide and is 10 in. long. The center bore or cavity is 2.5 in. in diameter. The truck 10 is capable of handling a 15 ton payload, and the truck's weight is 13 tons. The block is made of natural rubber having a durometer hardness of 70. The rubber block will be loaded to a maximum of 17,000 lbs. (static loading). At this static loading, the sidewalls are believed to bulge outwardly about 0.375 to 0.5 in. approximately as illustrated.

When the articulated vehicle 10 turned by actuating the cylinders 20, torque will of course be exerted upon the front axle assembly 28. A pair of stabilizer or torque bars 90 and 92 are therefore connected between opposite sides of the bolster plate structure 30 and the front and rear chassis walls 24 and 26 to brace the bolster plate to counteract the torque exerted on the bolster plate during turning. That is, the stabilizer bars prevent transverse shear loads from being exerted on the rubber block 70 during turning. The rear end of the right stabilizer bar 90 is pivotally connected to a bracket 96 at the right side of the bolsteer plate ahead of the axle assembly, and the front end of the bar 90 is pivotally mounted to a bracket pivotally connected to the chassis wall 24. Bar 92 is pivotally connected to brackets 98 and 100 respectively connected to the right end of the bolster plate and the rear chassis wall 26. The ends of the stabilizer bars are pivotally received on pins 94a, 96a, 98a, 100a, with rubber bushings being interposed between the pins and the bores formed transversely in the ends of the stabilizer bars. The rubber bushings are sufficiently thick, for example, 0.375 in. thick, so they may deform to permit the bolster plates to oscillate (pivot sideways) about the longitudinal axis A-A. Referring to FIG. 4, the bars extend in a common horizontal plane, and thus they do not support the weight of the vehicle by bracing the plate against vertical movement. Their only purpose is to prevent twisting forces exerted on the suspension during turning from being translated to the rubber block 70.

What is claimed is:

1. In a vehicle including a chassis with a longitudinal centerline and at least one rigid axle assembly having a central housing portion and axle housings extending from opposite sides thereof, an improved suspension for mounting the axle assembly to the chassis with the axle housings extending transversely of said centerline so that the assembly may oscillate about said centerline comprising:
   (a) a axle support frame having opposite front and rear ends, corresponding to the respective front and rear ends of the chassis, mounted to said axle assembly;
   (b) bearing means pivotally coupling the front end of said frame to the chassis to enable said frame to swivel about a point in alignment with said centerline;
   (c) means resiliently connecting the rear end of said frame to the chassis, said means including;
      (i) at least one block-like elastomeric member interposedly connected between the chassis and said frame, said block-like elastomeric member having an elongate cavity extending in longitudinal alignment with said centerline and having sidewalls which resiliently deform and bulge outward to permit said frame to oscillate about said centerline;
      (ii) a pair of spaced-apart vertically-extending flanges fixed to said frame to constrain bulging of said sidewalls of said elastomeric member in directions transverse to the longitudinal axis of the vehicle.

2. In the vehicle according to claim 1 wherein said elastomeric member is connected to the chassis so that the cavity therein is generally longitudinally aligned with said swivel point.

3. In a vehicle according to claim 1 said elastomeric member having rectangular outline in transverse cross-section and said cavity being circular in transverse cross-section.

* * * * *